United States Patent
Newton et al.

(10) Patent No.: US 6,198,401 B1
(45) Date of Patent: Mar. 6, 2001

(54) DETECTION OF SUB-CYCLE, SELF-CLEARING FAULTS

(75) Inventors: Timothy T. Newton, Anchorage, AK (US); Ljubomir Kojovic, Racine, WI (US)

(73) Assignee: McGraw Edison Company, Houston, TX (US)

(*) Notice: Subject to any disclaimer, the term of this patent is extended or adjusted under 35 U.S.C. 154(b) by 0 days.

(21) Appl. No.: 09/249,190

(22) Filed: Feb. 12, 1999

(51) Int. Cl.[7] .................................................. G08B 21/00
(52) U.S. Cl. ..................... 340/635; 340/654; 340/660; 324/500; 361/71
(58) Field of Search ................................. 340/635, 654, 340/660; 361/71; 324/500

(56) References Cited

U.S. PATENT DOCUMENTS

| | | |
|---|---|---|
| 4,322,677 | 3/1982 | Wright . |
| 4,897,607 | 1/1990 | Grunewald et al. . |
| 5,303,112 * | 4/1994 | Zulaski et al. ................... 361/67 |
| 5,530,365 | 6/1996 | Lefeldt . |
| 5,537,366 | 7/1996 | Gilmour . |
| 5,561,605 | 10/1996 | Zuercher et al. . |
| 5,682,100 | 10/1997 | Rossi et al. . |
| 5,726,574 | 3/1998 | Silverberg et al. . |
| 5,736,936 | 4/1998 | Bombay et al. . |
| 5,818,237 | 10/1998 | Zuercher et al. . |
| 5,839,092 | 11/1998 | Erger et al. . |
| 6,018,300 * | 1/2000 | Dowden et al. ................ 340/635 |

\* cited by examiner

*Primary Examiner*—Julie Lieu
(74) *Attorney, Agent, or Firm*—Fish & Richardson P.C.

(57) ABSTRACT

An apparatus which detects self-clearing faults in an AC power circuit carrying an electrical current is provided. To this end, the apparatus includes a fast element which detects an occurrence of a fault within one cycle of initiation, detects a clearing of the fault within one cycle of the clearing, and detects a duration of the fault to within one cycle or less. The apparatus further includes a self-clear element which compares the duration of the fault to a predetermined portion of a cycle of the electrical current to determine if the fault is self-clearing.

26 Claims, 13 Drawing Sheets

DETECTION OF SUB-CYCLE, SELF-CLEARING FAULTS

TECHNICAL FIELD

The invention relates to detecting faults in power circuits, and more particularly to the detection of sub-cycle, self-clearing faults that clear too quickly to trip a circuit breaker.

BACKGROUND

An AC power source produces a potential difference between its output terminals. Conventionally, the potential of the terminals is measured with respect to electrical ground. In typical power distribution systems, the AC frequency is 60 Hz.

To ensure personal safety and prevent property damage, overcurrent protection is provided on the AC line, particularly on high voltage lines. For example, a circuit breaker may be placed in a line to interrupt the electrical current in the line if the current exceeds some predetermined setting. A circuit breaker is an electrically-actuated switch that opens to stop current flow. Opening of the switch, also referred to as "tripping", may be in response to thermal or electromagnetic conditions in the circuit. After the circuit breaker opens, it may be reset or closed to allow current to again flow through the line.

SUMMARY

Some faults, referred to as self-clearing faults, are too short in duration to be detected by traditional detection techniques.

An apparatus for detecting such self-clearing faults in an AC power circuit carrying an electrical current includes a fast element which detects an occurrence of a fault within one cycle of initiation, detects clearing of the fault within one cycle of the clearing, and detects a duration of the fault to within one cycle or less. The apparatus further includes a self-clear element which compares the duration of the fault to a predetermined portion of a cycle of the electrical current to determine if the fault constitutes a self-clearing fault.

Embodiments may include one or more of the following features. For example, to determine if a fault has occurred, the fast element measures a value of the electrical current and compares the value to one or more reference values, such as high and low threshold values. The high and low threshold values may be calculated every several cycles or before the fault occurs, and may be based on one or more parameters associated with operation of an analog-to-digital conversion hardware and process used in measuring the current value and converting it to a digital value. Such parameters include a gain of a filter of the analog-to-digital converter, a calibration factor of the analog-to-digital converter, and a DC offset of the analog-to-digital converter.

To determine if the fault is self-clearing, the apparatus also may include an element which determines if the fault begins near a voltage peak.

The apparatus may compare a time of the fault with a time of one or more previous faults to determine a frequency of fault occurrences. The apparatus may then be configured to sound an alarm or open a circuit breaker in the AC circuit if the fault frequency exceeds a predetermined value.

The apparatus may also include a counter which records a number of fault occurrences. The apparatus may be configured to either sound an alarm or open a circuit breaker in the AC circuit if the number exceeds a predetermined value, or to increment the counter when the number is less than or equal to the predetermined value.

Other features and advantages will be apparent from the following description, including the drawings, and from the claims.

DETAILED DESCRIPTION

Water penetrating into a cable splice may accumulate and cause an insulation breakdown and a failure in a cable. This results in an electrical discharge (i.e. an arc) through the water. Heat produced by the discharge raises the temperature inside the cable splice. This causes evaporation of the water and an increase in the vapor pressure inside the splice, which extinguishes the arc. The initiation and clearing of the fault typically occur within a quarter cycle or half cycle. Since the fault is interrupted by the water vapor pressure resulting from the fault, this type of fault is called a "self-clearing" fault.

Figure 1:
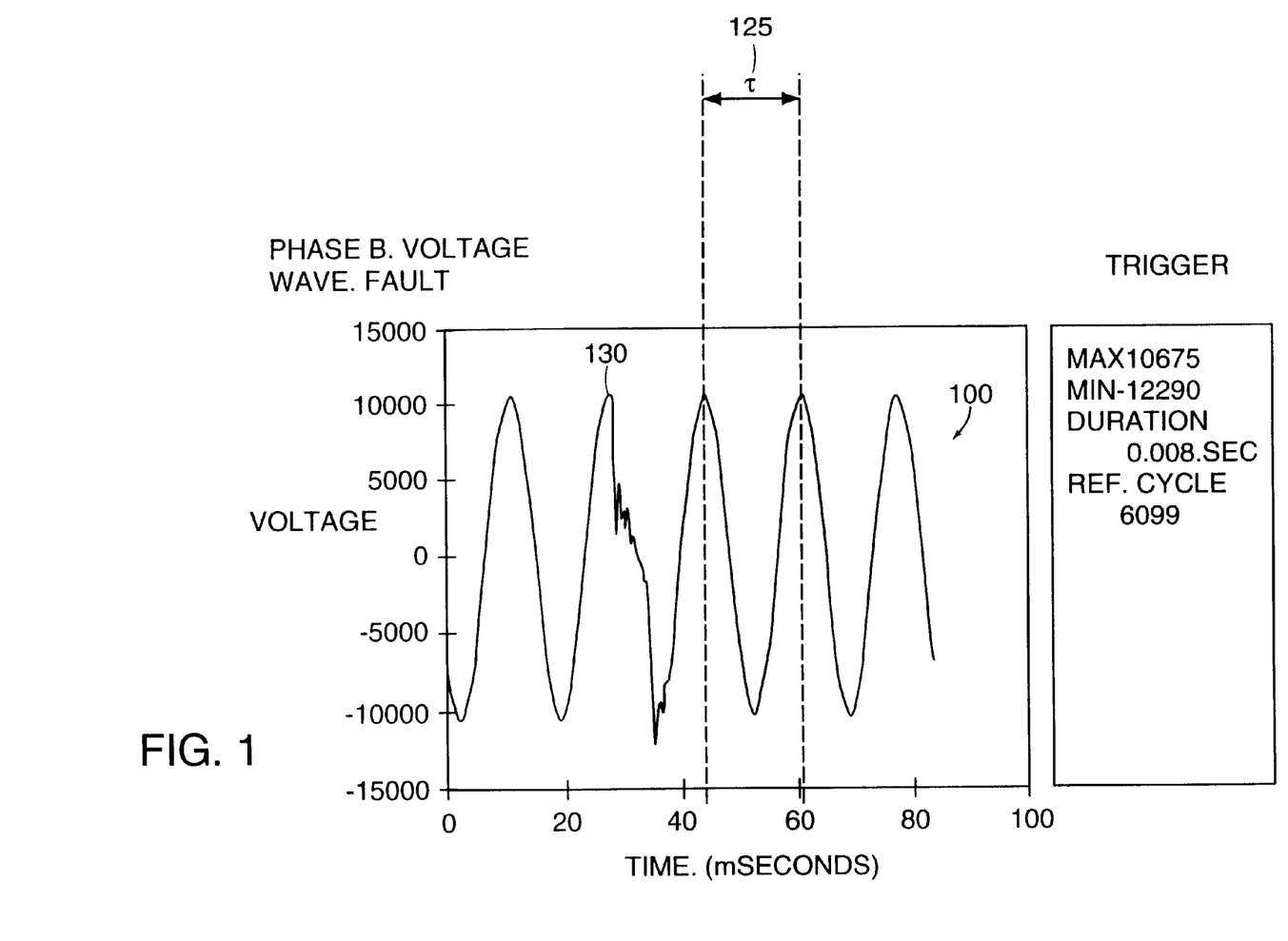
FIG. 1 is a voltage waveform during a self-clearing cable splice fault.
Figure 2:
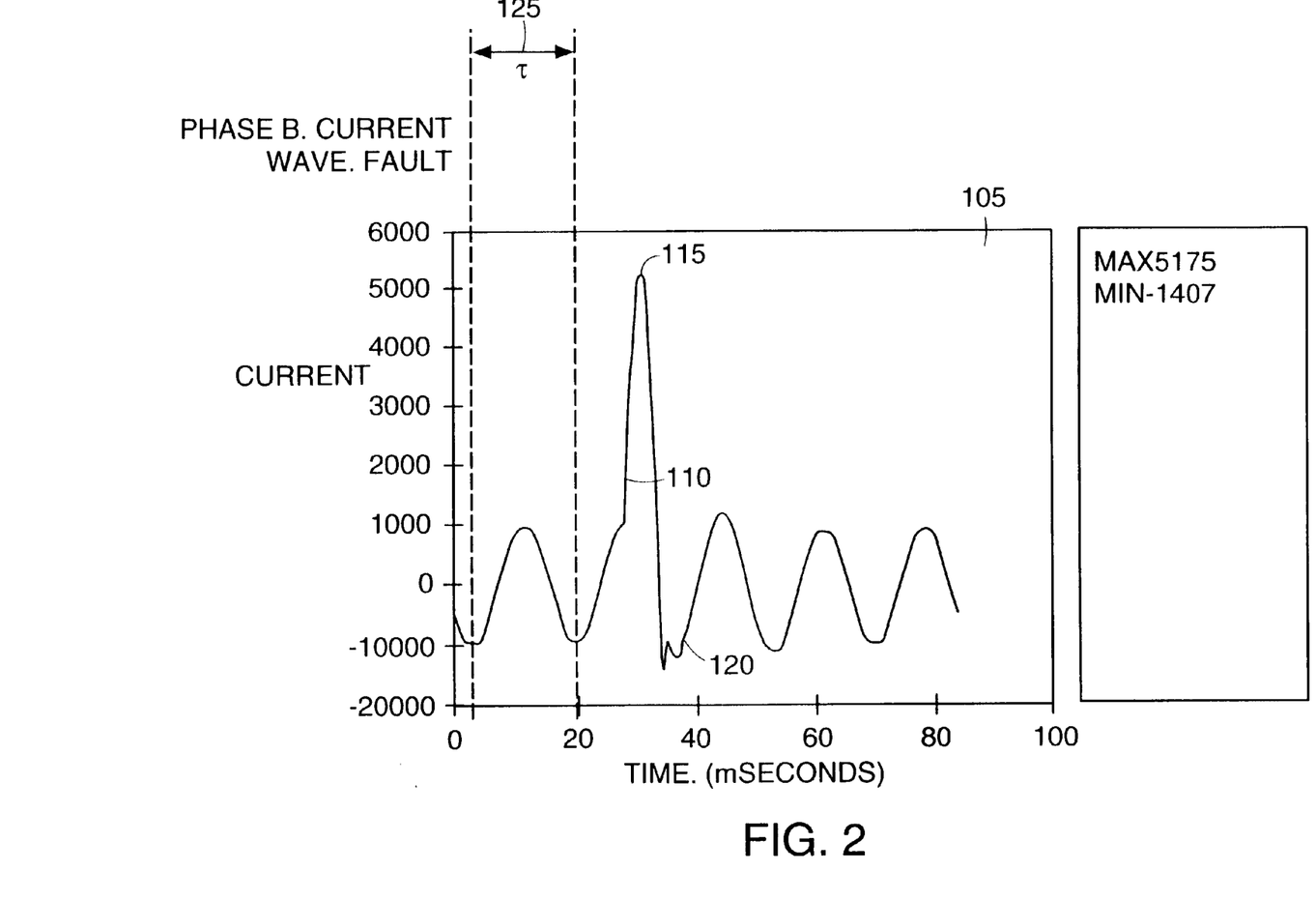
FIG. 2 is a current waveform during a self-clearing cable splice fault.

FIGS. 1 and 2 show, respectively, voltage 100 and current 105 waveforms during a self-clearing cable splice fault due to water penetrating into the splice. In FIG. 2, the current discharge 110, i.e. fault, begins at around 28 ms and is interrupted 115 4 ms later. The waveform recovers 120 by 36 ms, or 8 ms from the initiation of current discharge. Since a complete cycle 125 has a period τ of about 16 ms, the time between initiation and full recovery is less than half a cycle, with the fault being cleared within a quarter cycle. The interruption in the fault is due to heat produced by the fault, which evaporates the water and increases vapor pressure in the splice to extinguish the fault.

Self-clearing faults consistently exhibit certain characteristics. First, as shown in FIGS. 1 and 2, the fault is cleared within a quarter cycle of the current waveform. Second, as is also shown in FIGS. 1 and 2, self-clearing faults occur near a voltage peak 130. Third, their occurrence progresses in time. For example, initially they occur infrequently, maybe once a month. Then they occur several times a week and then several times a day. The end arrives when the splice fails and damages the cable. Thus, it becomes important to detect and monitor the occurrence and frequency of self-clearing faults.

Figure 3:
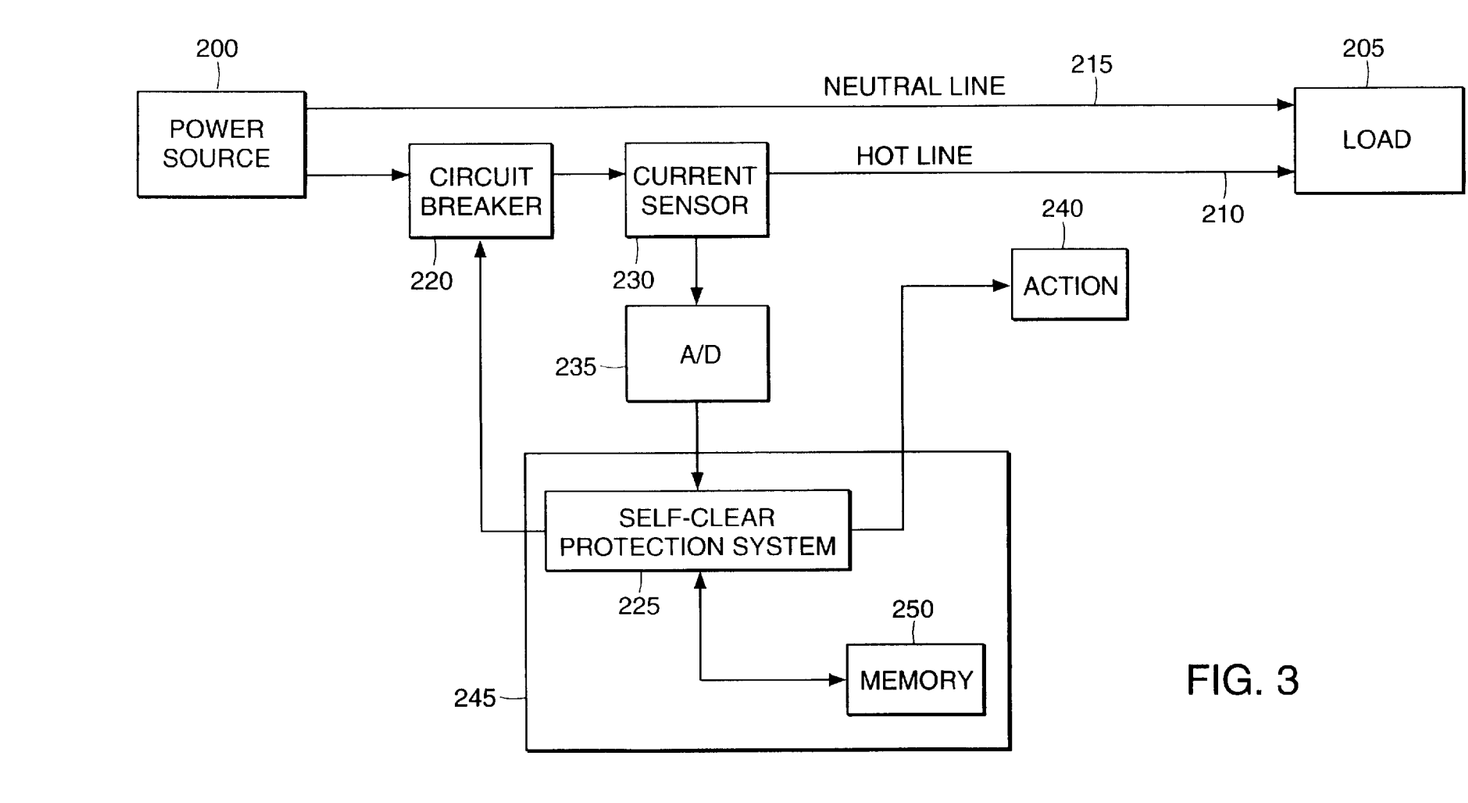
FIG. 3 is a block diagram of an electrical circuit including a self-clearing fault protection system.

Referring to FIG. 3, a single-phase AC power source 200 supplies a load 205 with a potential formed across two lines, a hot line 210 and a neutral line 215. For overcurrent protection, a circuit breaker 220 is inserted into the hot side of the AC line. To detect and respond to self-clearing faults, a self-clearing fault protection system 225 is implemented on the hot line 210. An analog current signal produced by a current sensor 230 is converted to a digital signal by analog-to-digital (A/D) conversion hardware and process 235. The protection system 225 receives the digital signal and processes it to determine if self-clearing faults are occurring at a high rate or in high numbers. When the frequency and number of self-clearing faults indicate that line failure is imminent, the system 225 responds by tripping the circuit breaker 220 or taking some other action 240, such as initiating an alarm. The system 225 also may be applied to a multi-phase power system, such as a tri-phase system, with the system detecting self-clearing faults in each phase of the power system.

The system 225 may be implemented in digital electronic circuitry, in computer hardware, in firmware, in software, or as a combination of these elements. For example, FIG. 3 shows implementation of the system as software running on a computer 245 having a memory 250. For ease of description, subsequent discussions often refer to implementation of the system 225 using digital electronic circuitry. However, it should be understood that the system may be implemented effectively using software or other approaches.

Figure 4:
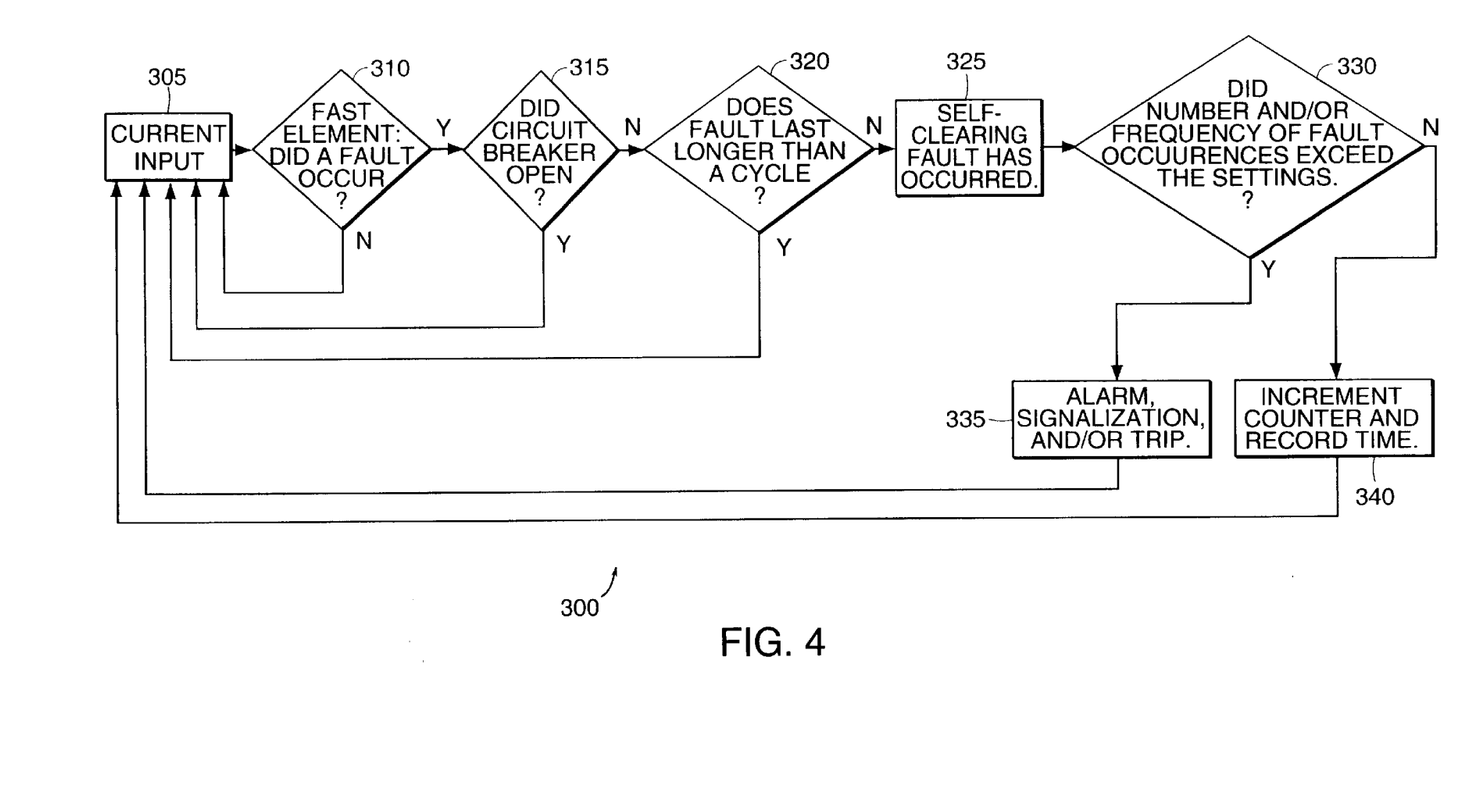
FIG. 4 is a flow chart of the self-clearing fault protection system of FIG. 3.

FIG. 4 shows a flow chart of a procedure 300 implemented by the overcurrent protection system 225 to detect and monitor sub-cycle self-clearing faults. In summary, the protection system 225 compares a digital sample of a current to high and low threshold values to determine if a fault has occurred. If a fault has occurred, the protection system 225 compares a duration of the fault to a predetermined fraction of a cycle period and determines whether the circuit breaker has tripped. If the duration of the fault is shorter than the fraction of a cycle period and the circuit breaker has not tripped, then a self-clearing fault has occurred.

The system 225 first receives a digital sample of current (step 305). Using a fast element, the system 225 determines whether a fault has occurred (step 310). If a fault has not occurred, then the system 225 waits for the next current sample (step 305). If a fault has occurred, then the system 225 determines if the circuit breaker 220 opened (step 315). If the circuit breaker opened, then the fault is not a self-clearing fault and must be dealt with externally by resetting the circuit breaker 220, and if necessary, determining the cause of the voltage or current surge. As such, the system 220 then waits for the next current sample (step 305).

If the circuit breaker 220 did not open, then the protection system 225 determines if the duration of the fault is shorter than a cycle (step 320). A self-clearing fault typically clears within a quarter cycle. If the fault lasts longer than a cycle, then it is not self-clearing and the protection system 225 waits for the next current sample (step 305).

If the fault duration is shorter than a cycle, then the protection system 225 determines that the fault is a self-clearing fault (step 325). The system then determines whether the number and frequency of self-clearing faults have exceeded predetermined settings (step 330). The frequency of self-clearing faults is monitored, since a high frequency of occurrences is a sign of imminent splice failure. If either the number or the frequency of fault occurrences exceeds the settings, then the system 225 activates an alarm or opens the circuit breaker (step 335).

If the number and the frequency of fault occurrences do not exceed the settings, then the system 225 increments a self-clearing fault counter and records the time at which the fault occurred (step 340). The recorded time is used in determining the fault frequency the next time a sub-cycle self-clearing fault occurs.

Figure 5:
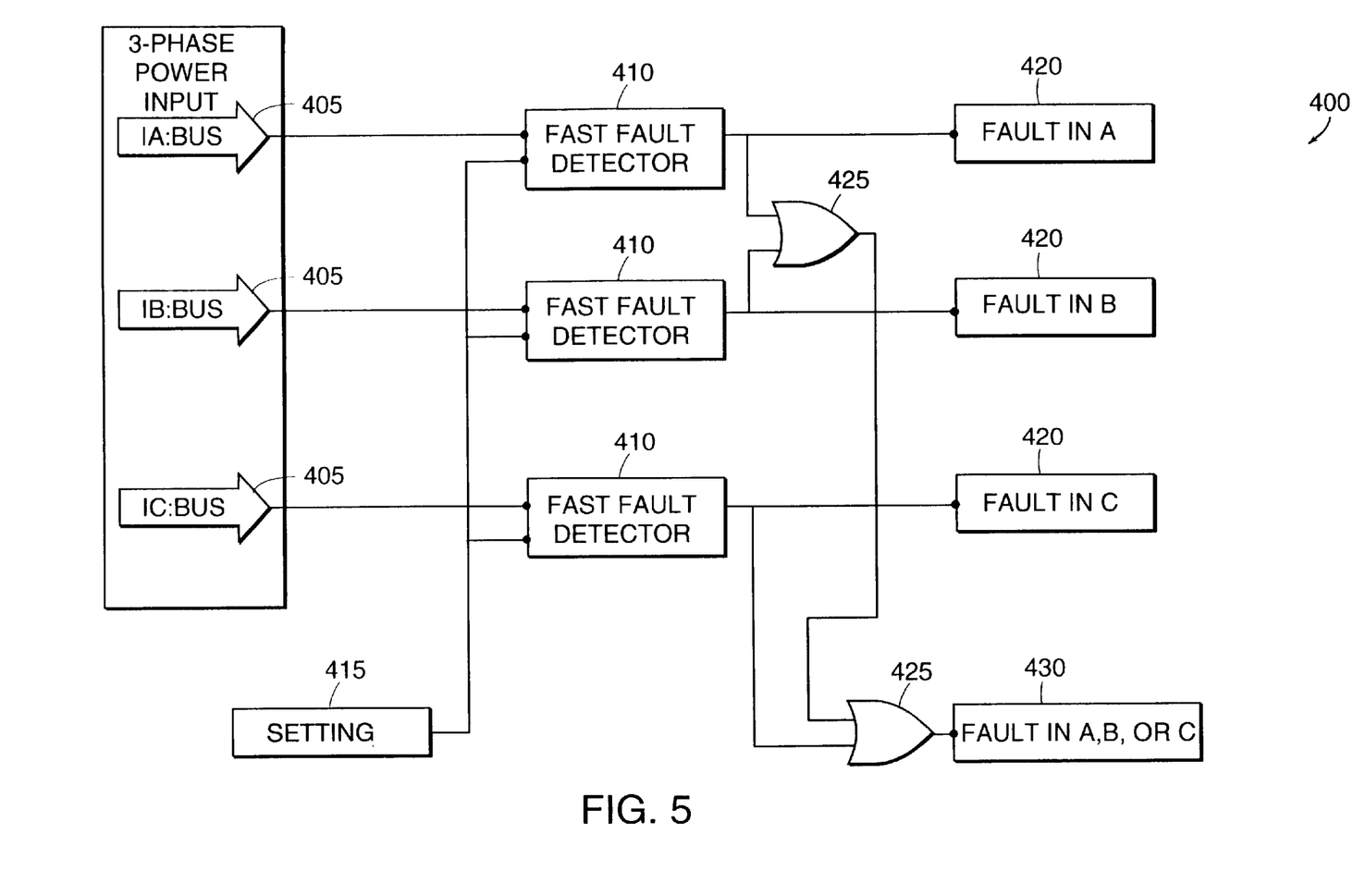
FIG. 5 is a block diagram of a fast fault detector for a tri-phase power signal.

FIG. 5 shows implementation of the fast fault detector 400 used to determine whether a fault has occurred. Typically, a high power source uses a three-phase signal, with the phases being represented as A, B, and C inputs 405. The three signals are offset from each other by phase differences. Fast fault detection elements 410 each receive a phase signal 405 and an external threshold setting 415. The output 420 of a fast fault detection element 410 has a value 1 if a fault has occurred and a value 0 if a fault has not occurred. Additionally, the three binary outputs are summed using OR gates 425 to provide an overall output 430 that designates whether a fault occurred in at least one of the inputs 405. If no fault occurred in any input 405, as indicated by the combined output 430, then the system 225 waits for the next current sample.

Figure 6:
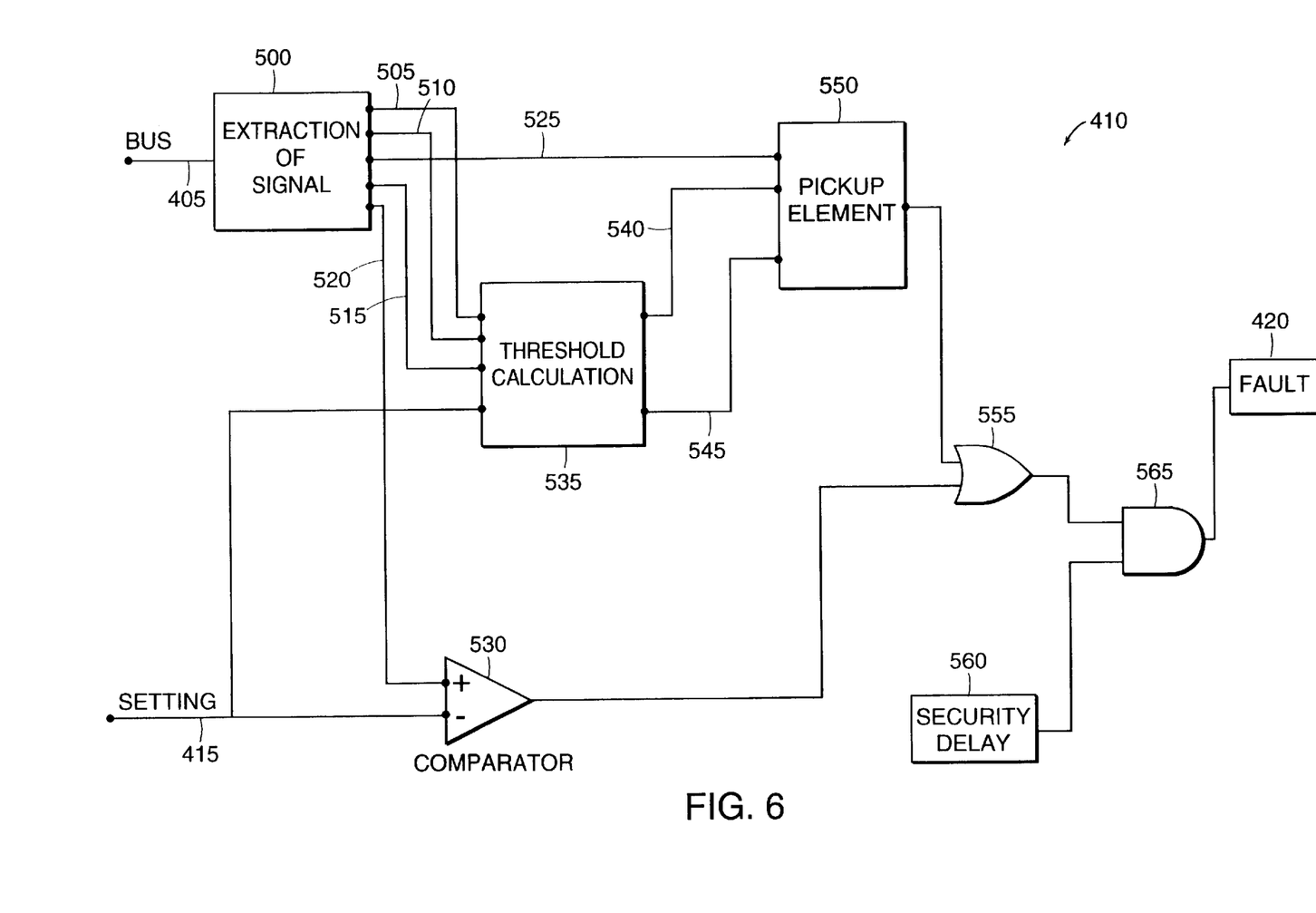
FIG. 6 is a block diagram of a fast fault detection element of the fault detector of FIG. 5.

FIG. 6 shows internal detail of a fast detection element 410 of FIG. 5. The input signal 405 is provided as a digital sample accompanied by related parameters on a bus. The digital samples from the bus are extracted by an extraction block 500 and provided to other components of the element 410. These parameters include a gain 505 of a filter of the A/D conversion hardware and process 235 used to generate the digital sample from the analog current, a correction signal or calibration factor 510 of the A/D conversion hardware and process 235, and a DC offset 515 of the A/D conversion hardware and process 235. The DC offset 515 is the output of the A/D conversion hardware and process 235 with no current input. The parameters also include a generic magnitude estimate 520 that represents a current magnitude averaged over one or more cycles. Finally, actual sample values 525 are extracted.

Traditional fault detectors employ the generic magnitude estimate 520 to detect faults. The magnitude of the current is time-averaged over one or more cycles. However, this average current value 520 does not respond quickly enough to detect sub-cycle, self-clearing faults.

In the element 410, a comparator 530 compares the generic magnitude estimate 520 to the external threshold setting 415, which may, for example, be set to 4 A. A comparator output of 1 indicates that the magnitude 520 is greater than the threshold setting 415 (i.e., that a fault has occurred), and an output of 0 indicates that the magnitude 520 is less than or equal to the threshold setting 415.

A threshold calculation block 535 calculates a high threshold value 540 and a low threshold value 545 based on the gain 505 of the filter, the calibration factor 510, the DC offset 515, and the external threshold setting 415. These thresholds are used to detect self-clearing faults. In one implementation, the high threshold 540 is:

$$\text{High Threshold} = \text{DC offset} + \frac{2(\text{external threshold})}{(\text{gain} \times \text{calibration factor})},$$

while the low threshold 545 is:

$$\text{Low Threshold} = \text{DC offset} - \frac{2(\text{external threshold})}{(\text{gain} \times \text{calibration factor})}.$$

Figure 7:
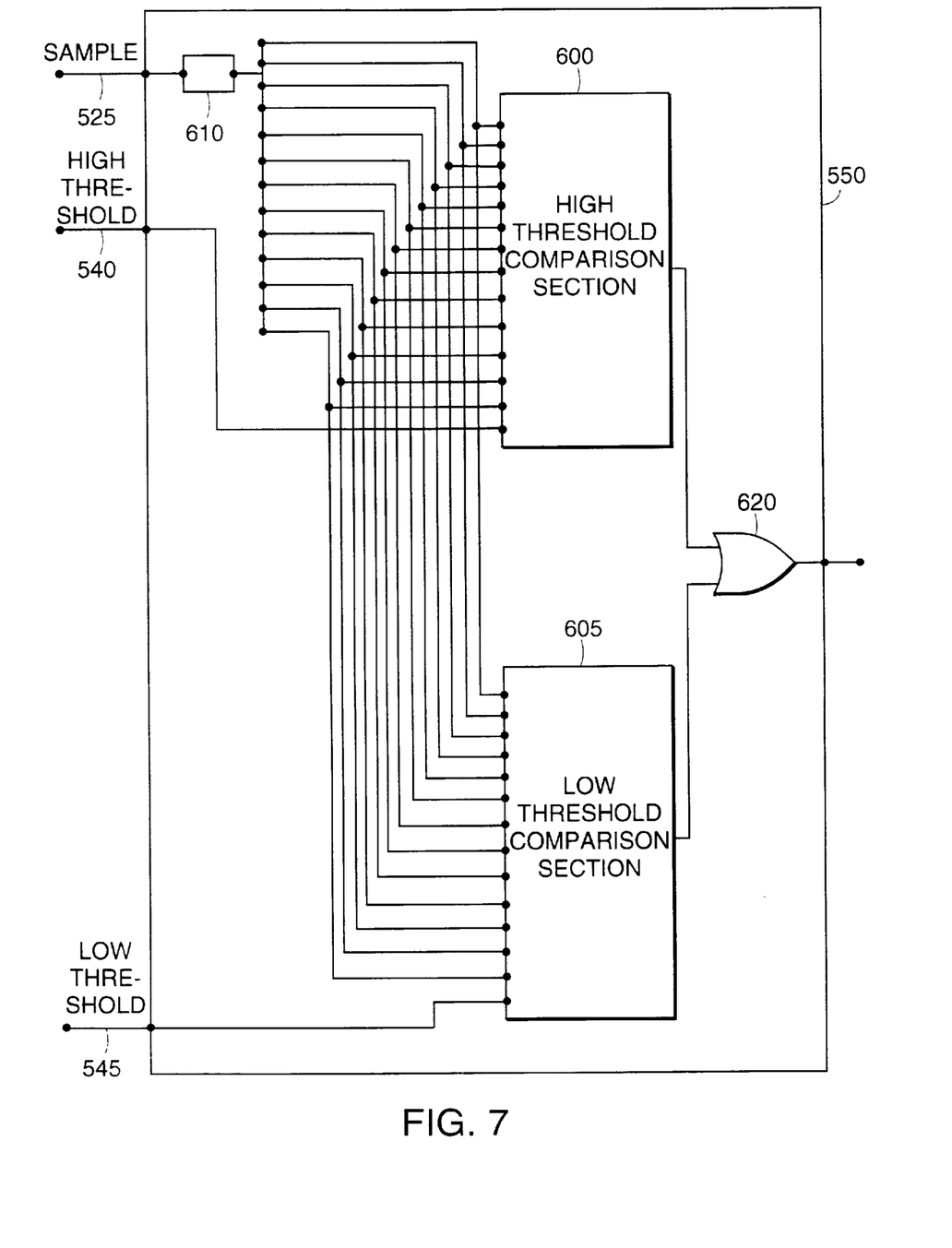
FIG. 7 is a block diagram of a pickup element of the fault detection element of FIG. 6.
Figure 8:
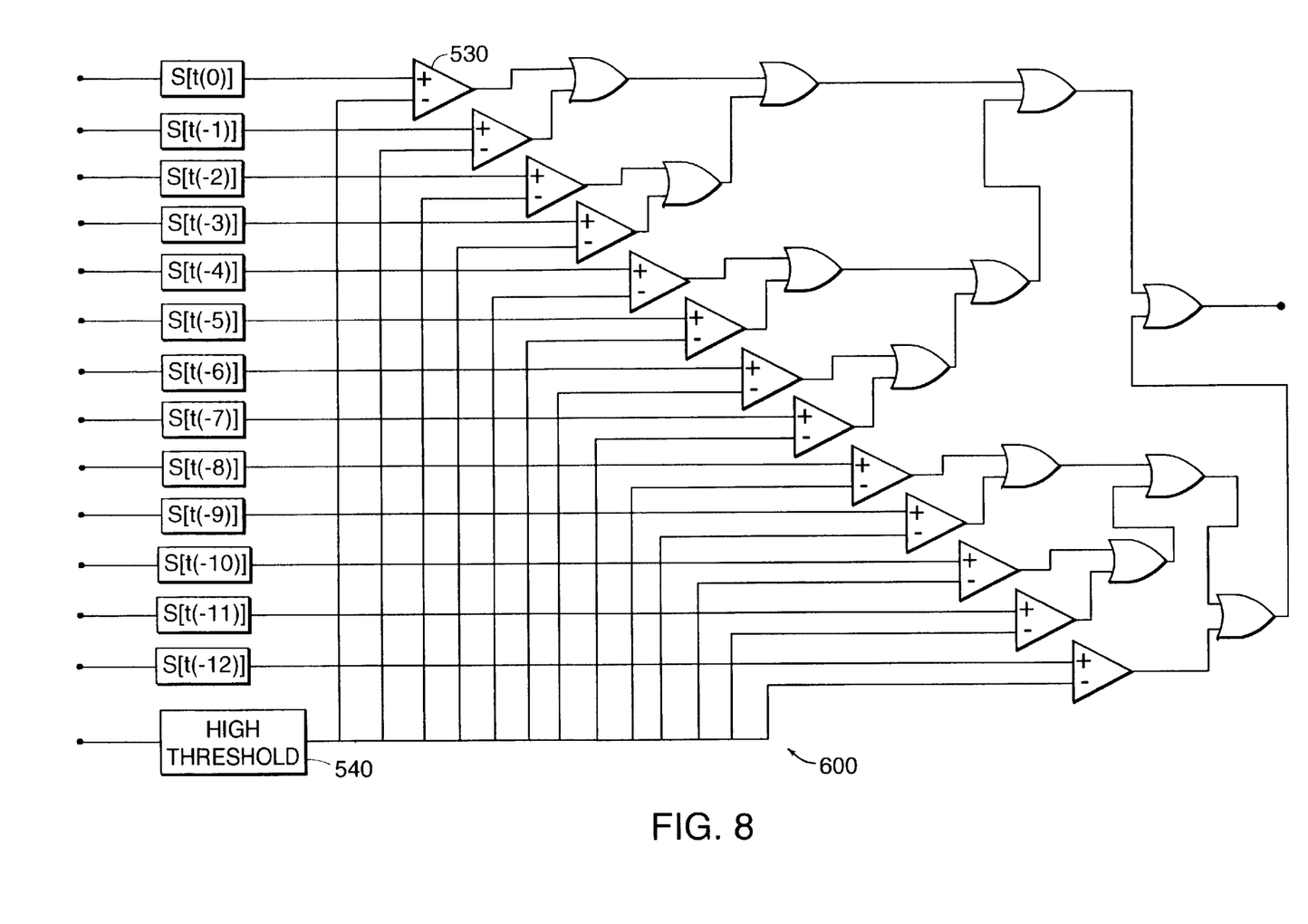
FIGS. 8 and 9 are block diagrams showing internal logic of a high and low threshold comparison blocks in the pickup element of FIG. 7.
Figure 9:
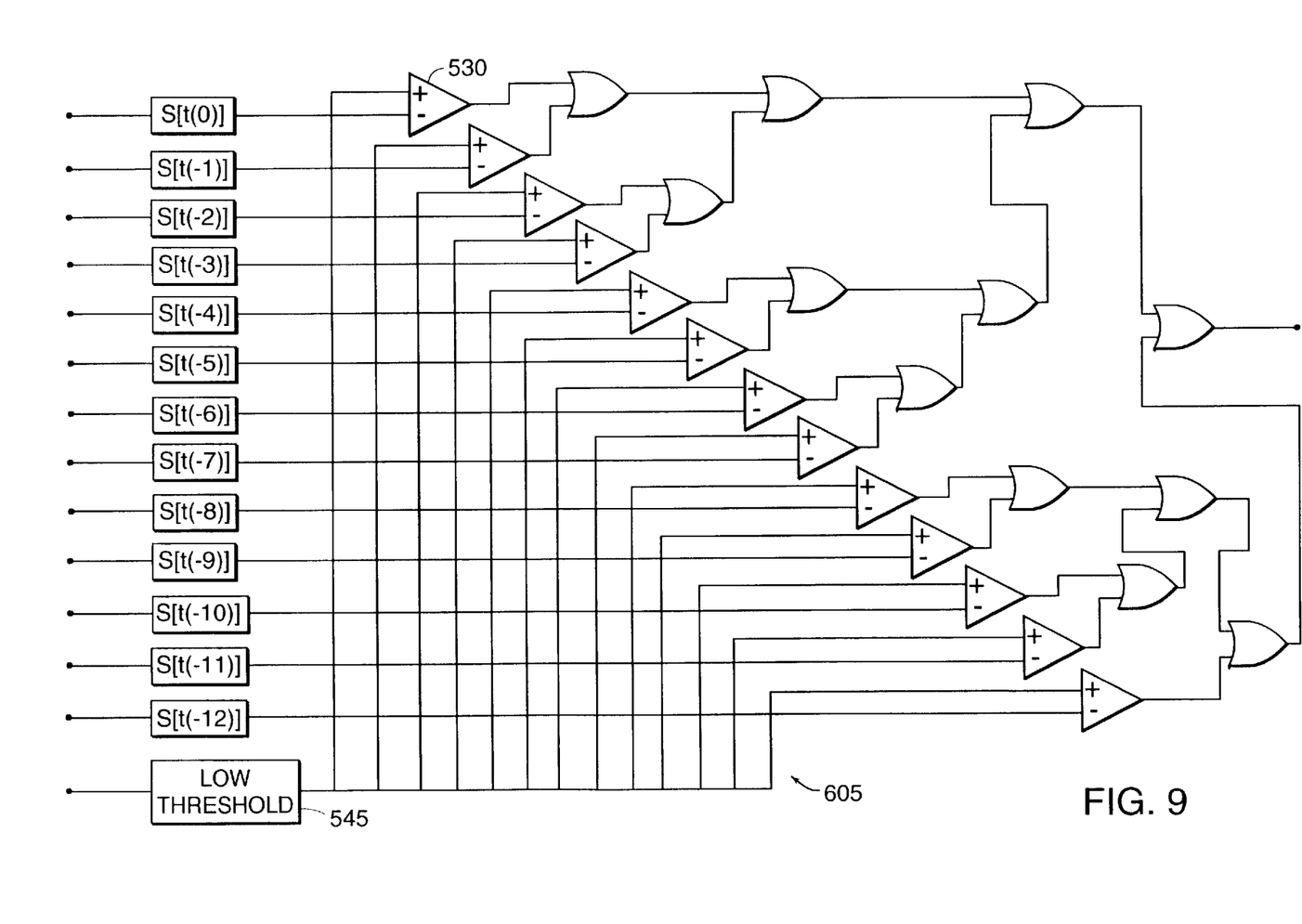

Referring again to FIG. 6, a pickup element 550 compares the digital samples 525 to the high and low threshold values 540, 545. FIGS. 7–9 show the logic implemented in the pickup element 550. The pickup element 550 includes a high threshold comparison section 600 and a low threshold comparison section 605. To ensure fast pickup, a shift register 610 saves prior digital samples S[t(−1)]...S[t(0−i)] for comparison to thresholds 540, 545 along with a current digital sample S[t(0)]. In one implementation, the parameter i equals 12 so that the current sample and the last 12 samples are included in the calculation. Retaining the prior digital samples helps to ensure proper operation for both symmetric and asymmetric faults.

In the high threshold comparison section 600, each sample S[t(0)]...S[t(0−i)] is compared to the high threshold 540 using a comparator 615. The outputs of the comparators 615 are combined using a tree of OR gates. A final output of the high threshold comparison section 600 has a value 1 if any one or more of the digital samples S[t(0)],...,S[t(−12)] is greater than the high threshold value 540.

The low threshold comparison section 605 operates in the same way to compare the samples to the low threshold. Thus, an output of the low threshold comparison section 605 has a value 1 if any one or more of the digital samples S[t(0)],...,S[t(−12)] is less than the low threshold value 545.

As shown in FIG. 7, binary values from the sections 600, 605 are combined using an OR gate 620. The output of the OR gate indicates whether a fault has occurred, i.e. whether one or more samples exceeds either the high threshold value or is less than the low threshold value.

Referring again to FIG. 6, the binary output of the pickup element 550 is combined with the binary output of the comparator 530 using an OR gate 555. The output of the OR gate 555 is combined with a security delay signal 560 using an AND gate 565 to ensure that the system operates for a set time, i.e. a few seconds, before the fast detection element signals that a fault has occurred.

Figure 10:
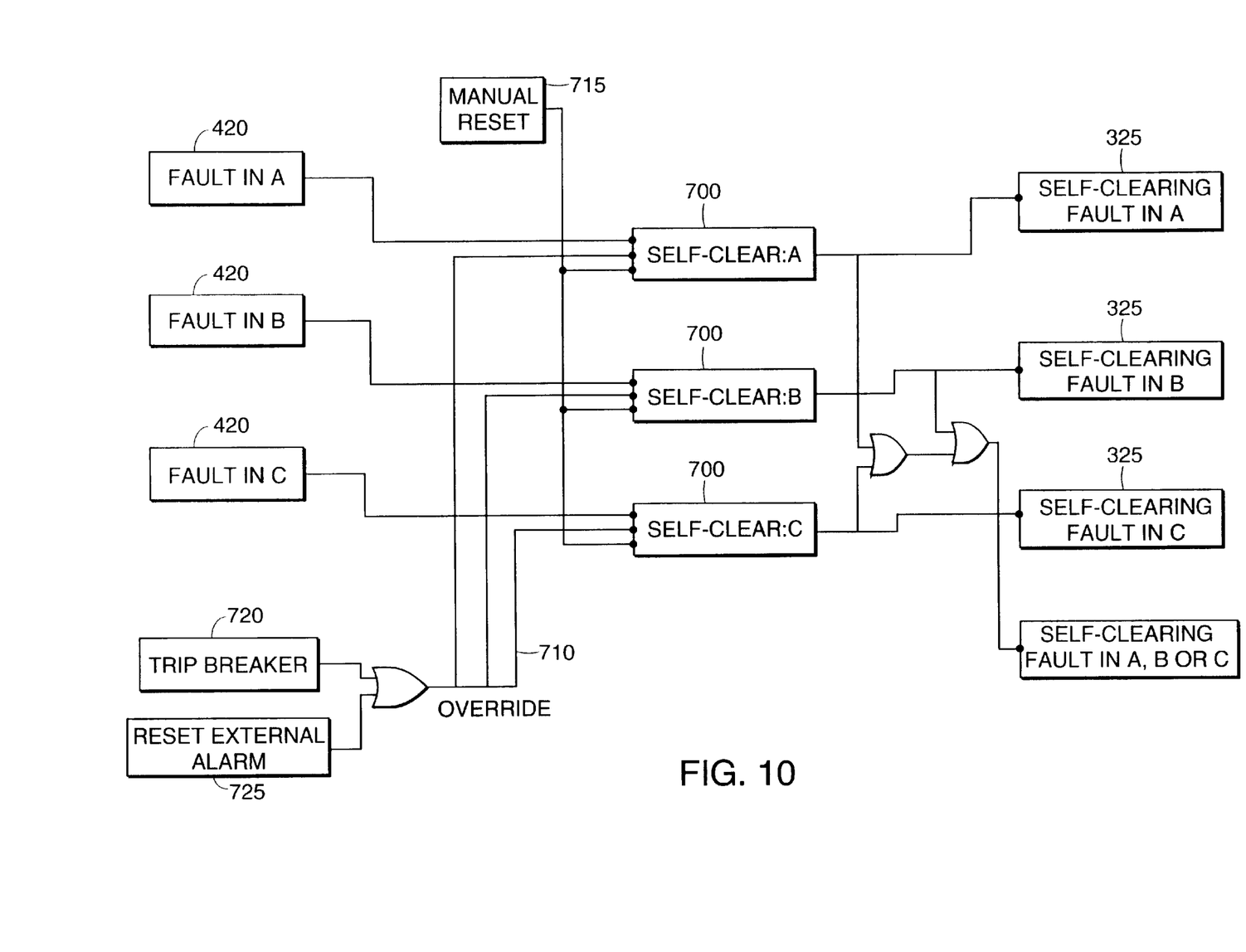
FIG. 10 is a block diagram of a self-clear element which receives input from the fault detection system of FIG. 5.

Referring also to FIG. 10, the output 420 of the AND gate 565 is provided to a self-clear element 700. If a fault has been detected, the self-clear element 700 determines if the fault is a self-clearing fault. If so, the element 700 records the time of the fault and increments a fault counter (shown in FIG. 11). Input to the self-clear element includes an override 710 and a manual reset 715. The manual reset 715 permits the fault counter to be reset to zero. The counter is used in determining the frequency of fault occurrences. The override 710 represents a tripped circuit breaker 720 or an external alarm reset 725 that blocks the self-clear logic and prevents a fault from being identified as a self-clearing fault. The output 325 of the self-clear element 700 indicates that a self-clearing fault has occurred.

Figure 11:
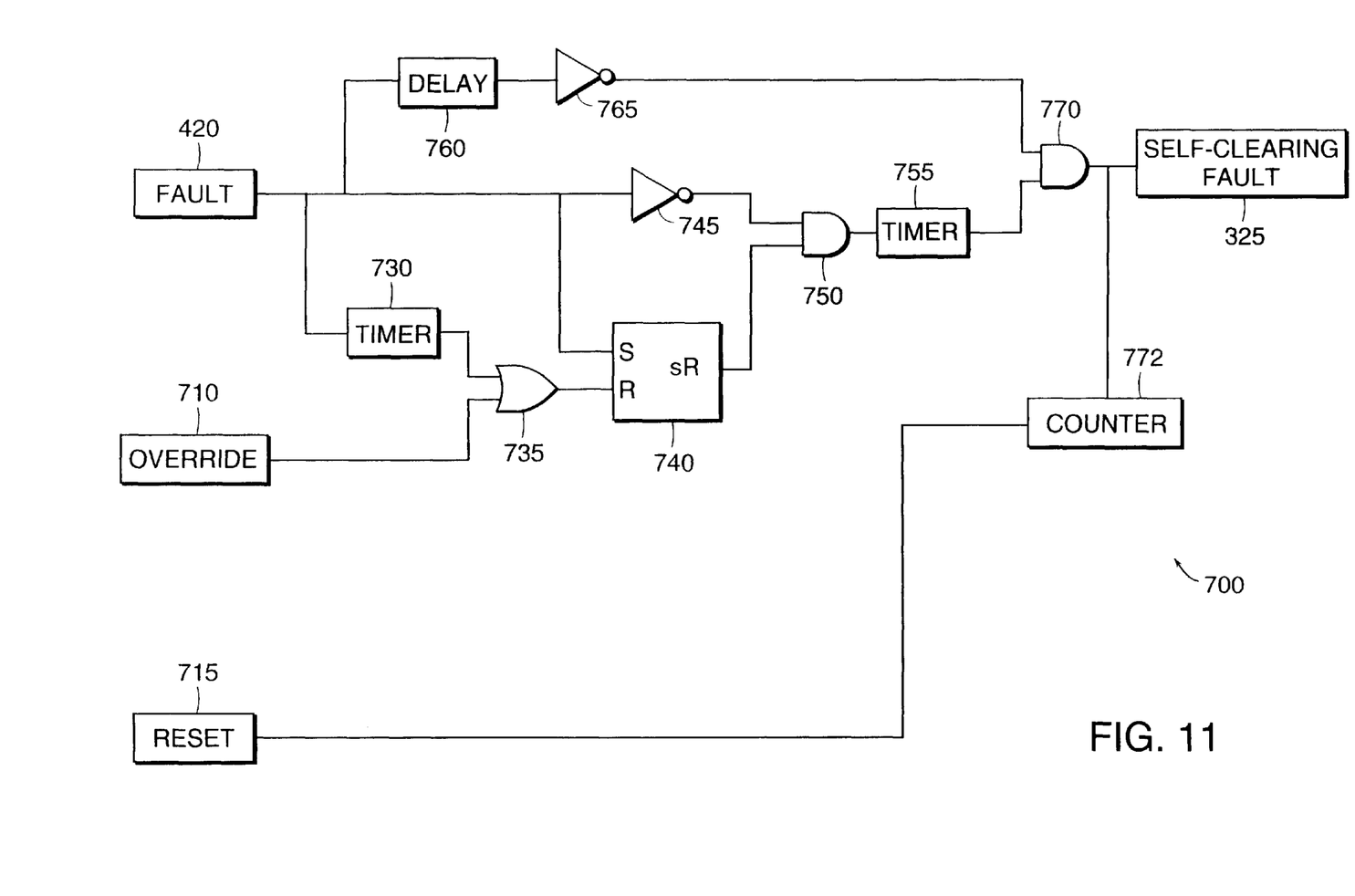
FIG. 11 is a block diagram showing logic of the self-clear element of FIG. 10.

Referring to FIG. 11, the output 420 of fast detection element 410 is provided to a timer 730 in the self-clear element 700. The timer 730 is activated by the transition of the output 570 from 0 to 1 in response to the occurrence of a fault. The timer 730 produces an output pulse having a value of 1 upon expiration of a time period associated with the timer. As discussed below, the timer output is used to reset the self-clear element 700 in preparation for the occurrence of another fault. As such, the time period of the timer needs to be less than the expected period between faults. In one implementation, for example, the timer 730 has an associated time period of 100 milliseconds.

The output of the timer 730 is combined with the override 710 by an OR gate 735, the output of which is provided to the RESET input of an sR flip-flop 740. The sR flip-flop produces an output of 0 when an input of 1 is supplied to the RESET input, produces an output of 1 when an input of 0 is supplied to the RESET input and an input of 1 is supplied to the SET input, and maintains its previous output state when inputs of 0 are supplied to both the SET input and the RESET input. Thus, the output of the SR flip-flop 740 will be reset to 0 whenever the timer 730 produces an output pulse having value 1, and whenever override 710 is asserted.

The output 420 of fast detection element 410 is provided to the SET input of the sR flip-flop 740. Thus, the output of the sR flip-flop 740 will be set to 1 whenever a fault is detected and override 710 is not asserted.

The output 420 also is provided to an inverter 745, the output of which is combined with the output of the sR flip-flop 740 by an AND gate 750. Thus, as long as the sR flip-flop has not been reset, the output of the AND gate 750 will transition from a 0 to a 1 when a fault goes away (i.e., when the output 420 transitions from a 1 to a 0).

The output of the AND gate 750 is provided to a timer 755. The timer 755 is activated by the transition of the output of the AND gate 750 from 0 to 1 in response to cessation of the fault. The timer 755 produces an output pulse having a value of 1 upon expiration of a time period associated with the timer. The timer 755 is used in verifying that the duration of the fault is less than a cycle. For proper system responsiveness, the time period is selected to have a value comparable to a cycle length and of sufficient duration to permit the circuit breaker to trip from a fault which is not self-clearing before the timer expires. In one implementation, in which the signal has a frequency of 60 Hz so that a cycle is roughly 17 milliseconds in duration, the timer 755 has an associated time period of 20 milliseconds.

The output 420 of fast detection element 410 also is provided to a delay 760. The delay 760 produces an output that corresponds to the output 420 but is delayed in time by a time period associated with the delay. The delay output is used in verifying that the duration of the fault is less than a cycle, and must have a time period that differs from that of the timer 755 by approximately a cycle. In the implementation noted above, the delay has a time period of 35 milliseconds.

The output of the delay 760 is provided to an inverter 765. The outputs of the timer 755 and the inverter 765 are combined by an AND gate 770, the output of which indicates that a self-clearing fault has occurred. In particular, the pulse produced by the timer 755 indicates that a fault occurred and later ceased. Due to the difference between the time periods of the timer 755 and the delay 760 (i.e., just over a cycle), the output of the inverter when the pulse is produced by the timer indicates whether the fault was in existence more than a cycle before the fault ceased. If the output of the delay is 1, indicating that the fault was not in existence more than a cycle before the fault ceased, then the AND gate 770 will produce a pulse indicative of a self-clearing fault in response to the pulse from the timer 755. This pulse increments the counter 772 used in monitoring the occurrence of self-clearing faults. If the output of the inverter is 0, indicating that the fault was in existence more than a cycle before the fault ceased, then the AND gate 770 will not produce a pulse indicative of a self-clearing fault.

If the override 710 operates during or just after occurrence of a fault, then the sR flip-flip is reset and no self-clearing fault is indicated. The self-clear element 740 may be further configured to display a number of events indicated by the counter, display a frequency of events, and trip a circuit breaker as discussed above.

Figure 12:
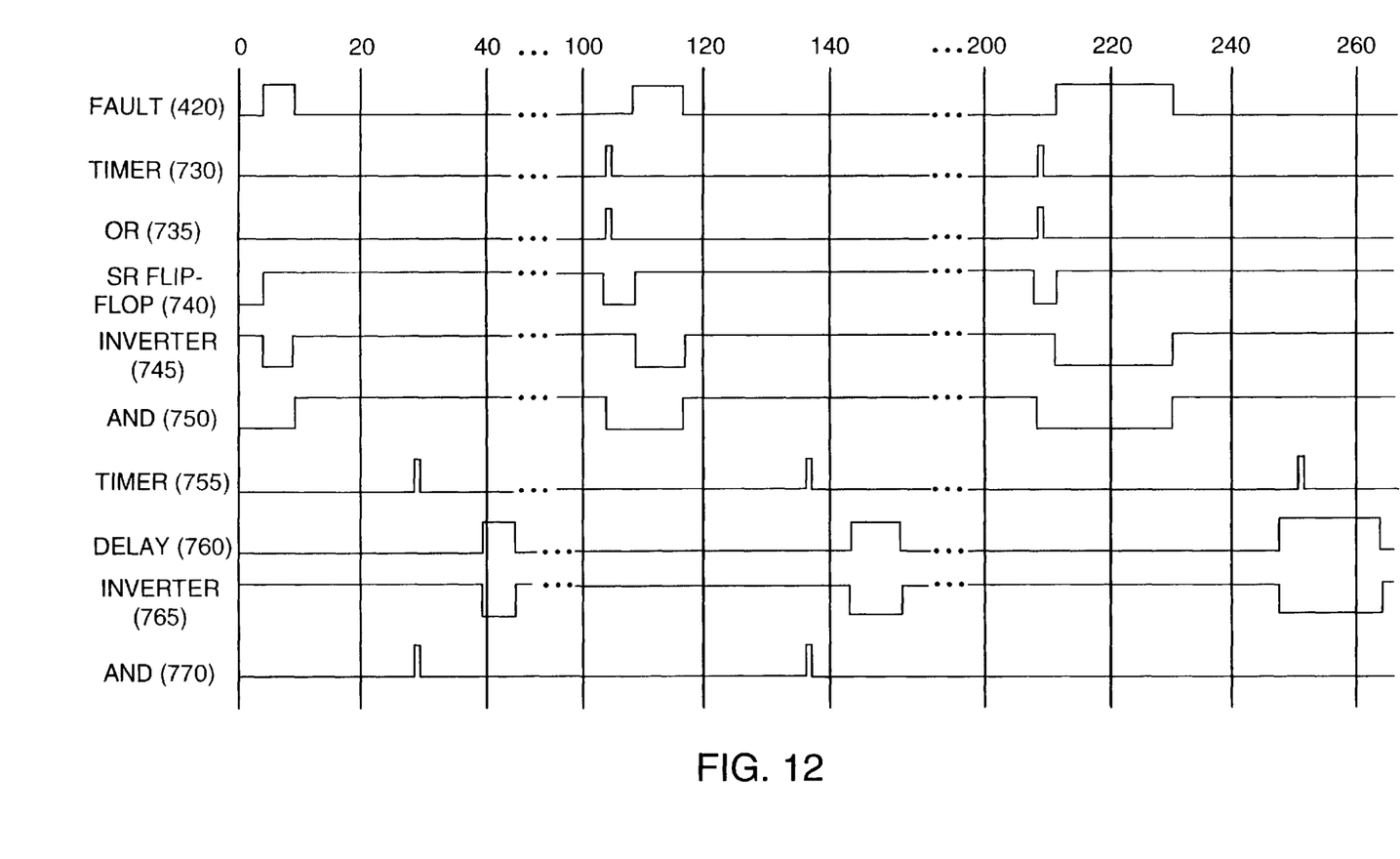
FIG. 12 is a timing diagram illustrating operation of the self-clear element logic of FIG. 11.

Operation of the self-clear element 700 may be further understood with reference to the timing diagrams of FIG. 12. As shown, a first fault occurs at 4 milliseconds and clears at 8 milliseconds (i.e., in a quarter cycle), such that the fault is a self-clearing fault.

At 4 milliseconds, in response to the fault, the output of the sR flip-flop 740 transitions from 0 to 1 and the output of the inverter 745 transitions from 1 to 0.

At 8 milliseconds, in response to clearing of the fault, the outputs of the inverter 745 and the AND gate 750 both transition from 0 to 1.

At 28 milliseconds, in response to the transition of the output of the AND gate 750, the output of the timer 755 pulses to 1 and, since the output of the inverter 765 is 1, the output of the AND gate 770 produces a pulse indicative of a self-clearing fault.

At 39 milliseconds, 35 milliseconds after the fault began, the output of the delay 760 transitions from 0 to 1 and the output of the inverter 765 transitions from 1 to 0. These outputs return to their previous states at 43 milliseconds, 35 milliseconds after the fault clears.

At 104 milliseconds, 100 milliseconds after the fault began, the output of the timer 730 produces a pulse to 1 that causes the output of the OR gate 735 to pulse to 1 and reset the sR flip-flop 740. This causes the output of the AND gate 750 to transition from 1 to 0.

A second fault occurs at 108 milliseconds and clears at 116 milliseconds (i.e., in a half cycle), such that the fault is a self-clearing fault.

At 108 milliseconds, in response to the fault, the output of the sR flip-flop 740 transitions from 0 to 1 and the output of the inverter 745 transitions from 1 to 0.

At 116 milliseconds, in response to clearing of the fault, the outputs of the inverter 745 and the AND gate 750 both transition from 0 to 1.

At 136 milliseconds, in response to the transition of the output of the AND gate 750, the output of the timer 755 pulses to 1 and, since the output of the inverter 765 is 1, the output of the AND gate 770 produces a pulse indicative of a self-clearing fault.

At 143 milliseconds, 35 milliseconds after the second fault began, the output of the delay 760 transitions from 0 to 1 and the output of the inverter 765 transitions from 1 to 0. These outputs return to their previous states at 151 milliseconds, 35 milliseconds after the fault clears.

At 208 milliseconds, 100 milliseconds after the second fault began, the output of the timer 730 produces a pulse that causes the OR gate 735 to produce a pulse at its output that resets the sR flip-flop 740. This causes the output of the AND gate 750 to transition from 1 to 0.

A third fault occurs at 212 milliseconds and clears at 230 milliseconds (i.e., in more than a one cycle), such that the fault is not a self-clearing fault.

At 212 milliseconds, in response to the third fault, the output of the sR flip-flop 740 transitions from 0 to 1 and the output of the inverter 745 transitions from 1 to 0.

At 247 milliseconds, 35 milliseconds after the third fault began, the output of the delay 760 transitions from 0 to 1 and the output of the inverter 765 transitions from 1 to 0.

At 230 milliseconds, in response to clearing of the third fault, the outputs of the inverter 745 and the AND gate 750 both transition from 0 to 1.

At 250 milliseconds, in response to the transition of the output of the AND gate 750, the output of the timer 755 pulses to 1. However, since the output of the inverter 765 is 0, the output of the AND gate 770 does not produce a pulse indicative of a self-clearing fault.

At 265 milliseconds, 35 milliseconds after the third fault cleared, the output of the delay 760 transitions from 1 to 0 and the output of the inverter 765 transitions from 0 to 1.

Figure 13:
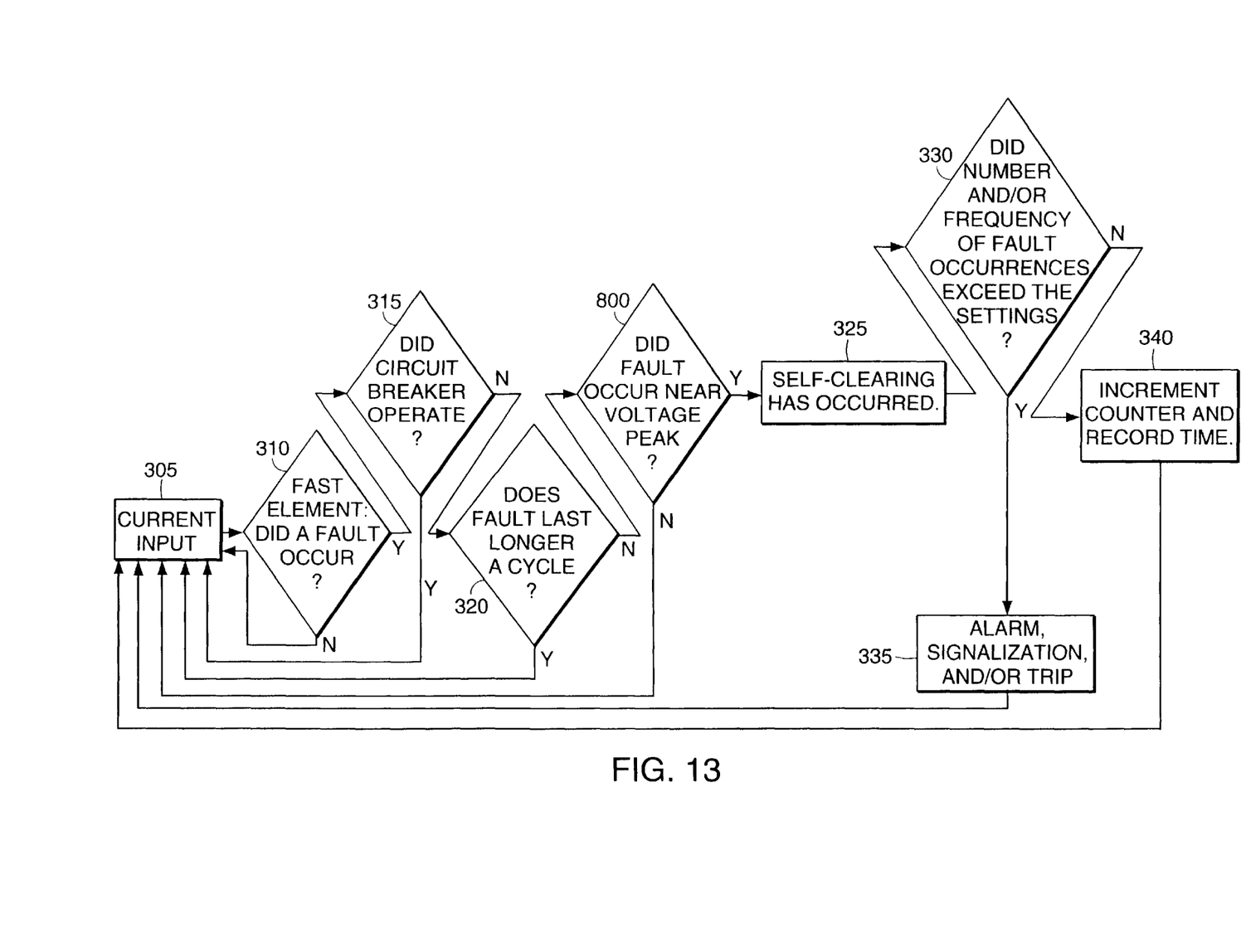
FIG. 13 is a block diagram of a second self-clearing fault protection system.

Referring to FIG. 13, an alternate implementation of an overcurrent protection system for sub-cycle self-clearing faults includes a decision block that determines if the fault occurs near a voltage peak (step 800). One characteristic of self-clearing sub-cycle faults is that they occur at a voltage maximum. Thus, this decision block is used, in addition to blocks 315, 320, to determine if the fault is actually self-clearing.

Other embodiments are within the scope of the following claims.

What is claimed is:

1. An apparatus for detecting self-clearing faults in an AC power circuit carrying an electrical current, comprising:
    a fast element operable to:
        detect an occurrence of a fault within one cycle of initiation,
        detect clearing of the fault within one cycle of the clearing, and
        detect a duration of the fault to within one cycle or less; and
    a self-clear element operable to compare the duration of the fault to a predetermined portion of a cycle of the electrical current to determine if the fault is self-clearing.

2. The apparatus of claim 1, wherein the fast element is operable to:
    measure a value of the electrical current; and
    compare the value to high and low threshold values to determine if a fault has occurred.

3. The apparatus of claim 2, wherein the fast element calculates the high and low threshold values before the fault occurs.

4. The apparatus of claim 3, further comprising analog-to-digital conversion circuitry which converts the current value to a digital value, wherein the fast element uses one or more parameters associated with operation of the analog-to-digital conversion circuitry to calculate the threshold values.

5. The apparatus of claim 1, further comprising analog-to-digital conversion circuitry which produces a digital signal representative of the value of the electrical current, wherein the fast element uses the digital signal to determine if a fault has occurred.

6. The apparatus of claim 5, wherein the fast element compares the digital signal to a reference value in detecting an occurrence of the fault.

7. The apparatus of claim 6, wherein the fast element calculates the reference value before the fault occurs.

8. The apparatus of claim 6, wherein the fast element calculates the reference value based on one or more of:
    a gain of a filter of the analog-to-digital conversion circuitry;
    a calibration factor of the analog-to-digital conversion circuitry; and
    a DC offset of the analog-to-digital conversion circuitry.

9. The apparatus of claim 1, further comprising an element operable to determine if the fault begins near a voltage peak, wherein the self-clearing element only determines that the fault is self-clearing when the fault begins near a voltage peak.

10. The apparatus of claim 1, wherein the self-clear element is operable to compare a time of the fault with a time of one or more previous faults to determine a frequency of fault occurrences, wherein the self-clear element takes corrective action when the frequency is greater than a predetermined value, the corrective action including one or more of sounding an alarm and opening a circuit breaker.

11. The apparatus of claim 1, further comprising a counter operable to record a number of fault occurrences, wherein the self-clear element takes corrective action when the number is greater than a predetermined value, the corrective action includes sounding an alarm or opening a circuit breaker; and the self-clear element increments the counter when the number is less than or equal to the predetermined value.

12. The apparatus of claim 1, wherein the fast element is operable to detect a fault in a single-phase AC power signal.

13. The apparatus of claim 1, wherein the fast element is operable to detect a fault in a multi-phase AC power signal.

14. A method for detecting self-clearing faults in an AC power circuit carrying an electrical current, the method comprising:

automatically determining if a fault has occurred;

when a fault has occurred, automatically comparing a duration of the fault to a predetermined portion of a cycle of the electrical current; and when the duration of the fault is shorter than the predetermined portion of the cycle of the electrical current, automatically designating the fault as a self-clearing fault.

15. The method of claim 14, further comprising measuring a magnitude of the electrical current, wherein determining if a fault has occurred includes comparing the magnitude to high and low threshold values.

16. The method of claim 15, further comprising calculating the high and low threshold values before the fault occurs.

17. The method of claim 16, further comprising converting the magnitude to a digital value using analog-to-digital conversion circuitry, wherein calculating the threshold value comprises using one or more parameters associated with operation of the analog-to-digital conversion circuitry.

18. The method of claim 14, further comprising using analog-to-digital conversion circuitry to produce a digital signal representative of a magnitude of the electrical current, and using the digital signal in determining if a fault has occurred.

19. The method of claim 18, wherein determining if a fault has occurred includes comparing the digital signal to a reference value.

20. The method of claim 19, wherein the reference value is calculated before the fault occurs.

21. The method of claim 19, wherein the reference value depends on one or more of:

a gain of a filter of the analog-to-digital conversion circuitry;

a calibration factor of the analog-to-digital conversion circuitry; and a DC offset of the analog-to-digital conversion circuitry.

22. The method of claim 14, further comprising when a fault has occurred, determining if the fault begins near a voltage peak to determine if the fault is self-clearing.

23. The method of claim 14, further comprising:

when a fault is self-clearing, comparing a time of the fault with a time of one or more previous faults to determine a frequency of fault occurrences; and when the frequency is greater than a predetermined value, taking corrective action, wherein the corrective action includes sounding an alarm or opening a circuit breaker.

24. The method of claim 14, further comprising:

when a fault is self-clearing, determining a number of fault occurrences;

when the number is greater than a predetermined value, taking corrective action, wherein the corrective action includes sounding an alarm or opening a circuit breaker; and when the number is less than or equal to the predetermined value, incrementing a counter.

25. The method of claim 14, further comprising determining if a fault has occurred in a single-phase AC signal.

26. The method of claim 14, further comprising determining if a fault has occurred in a multi-phase AC signal.

* * * * *